United States Patent
Yoo et al.

(10) Patent No.: US 9,961,294 B2
(45) Date of Patent: May 1, 2018

(54) VIDEO DISPLAY METHOD AND USER TERMINAL FOR GENERATING SUBTITLES BASED ON AMBIENT NOISE

(71) Applicant: Samsung Electronics Co., Ltd., Suwon-si (KR)

(72) Inventors: Sang Hyun Yoo, Seoul (KR); Hoshik Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

(21) Appl. No.: 14/614,760

(22) Filed: Feb. 5, 2015

(65) Prior Publication Data

US 2016/0029016 A1    Jan. 28, 2016

(30) Foreign Application Priority Data

Jul. 28, 2014    (KR) ........................ 10-2014-0095706

(51) Int. Cl.
| | |
|---|---|
| *H04N 5/60* | (2006.01) |
| *H04N 5/445* | (2011.01) |
| *H04N 21/422* | (2011.01) |
| *H04N 21/439* | (2011.01) |
| *H04N 21/442* | (2011.01) |
| *H04N 21/45* | (2011.01) |
| *H04N 21/466* | (2011.01) |
| *H04N 21/485* | (2011.01) |
| *H04N 21/488* | (2011.01) |
| *H04N 17/00* | (2006.01) |

(52) U.S. Cl.
CPC .............. *H04N 5/60* (2013.01); *H04N 5/445* (2013.01); *H04N 21/42203* (2013.01); *H04N 21/4394* (2013.01); *H04N 21/442* (2013.01); *H04N 21/4524* (2013.01); *H04N 21/4532* (2013.01); *H04N 21/4662* (2013.01); *H04N 21/4852* (2013.01); *H04N 21/4884* (2013.01); *H04N 2005/44526* (2013.01); *H04N 2017/006* (2013.01)

(58) Field of Classification Search
CPC .... H04N 17/00; H04N 5/445; H04N 5/44513; H04N 5/60; H04N 2005/44526; H04N 2007/006; H04N 2007/008
See application file for complete search history.

(56) References Cited

U.S. PATENT DOCUMENTS

| | | | |
|---|---|---|---|
| 8,010,366 B1 | 8/2011 | Kearby et al. | |
| 8,554,558 B2 * | 10/2013 | McCarley | G06F 17/2818 348/468 |

(Continued)

FOREIGN PATENT DOCUMENTS

| | | |
|---|---|---|
| KR | 10-0146101 B1 | 5/1998 |
| KR | 10-0735878 B1 | 7/2007 |

(Continued)

*Primary Examiner* — Jefferey F Harold
*Assistant Examiner* — Sean N. Haiem
(74) *Attorney, Agent, or Firm* — NSIP Law (57) ABSTRACT

A video display method of a user terminal, includes determining whether ambient noise measured when a video is played is in an allowable range, and generating subtitles based on a voice signal included in the video in response to the ambient noise being determined to be out of the allowable range. The method further includes displaying the generated subtitles with the video.

18 Claims, 3 Drawing Sheets

(56) References Cited

U.S. PATENT DOCUMENTS

| | | | |
|---|---|---|---|
| 8,977,974 B2* | 3/2015 | Kraut | H04N 5/60 320/129 |
| 2005/0033193 A1* | 2/2005 | Wasden | A61B 5/121 600/559 |
| 2005/0038661 A1* | 2/2005 | Momosaki | G10L 25/00 704/275 |
| 2005/0226398 A1 | 10/2005 | Bojeun | |
| 2006/0044479 A1* | 3/2006 | Heo | H04N 5/445 348/738 |
| 2006/0069548 A1* | 3/2006 | Matsuura | G01C 21/3629 704/200.1 |
| 2007/0118364 A1 | 5/2007 | Wise et al. | |
| 2007/0118373 A1 | 5/2007 | Wise et al. | |
| 2010/0146445 A1* | 6/2010 | Kraut | H04N 5/60 715/821 |
| 2012/0173235 A1* | 7/2012 | Mountain | G10L 15/26 704/235 |
| 2012/0259441 A1* | 10/2012 | Armstrong | H03G 3/32 700/94 |
| 2014/0112506 A1* | 4/2014 | Hopkins | H04N 21/4223 381/306 |
| 2014/0267543 A1* | 9/2014 | Kerger | H04W 76/005 348/14.02 |
| 2014/0334644 A1* | 11/2014 | Selig | G06F 3/165 381/108 |
| 2016/0014476 A1* | 1/2016 | Caliendo, Jr. | H04N 21/8133 725/32 |

FOREIGN PATENT DOCUMENTS

| | | |
|---|---|---|
| KR | 10-0778214 B1 | 11/2007 |
| KR | 10-2009-0048853 A | 5/2009 |
| KR | 10-1041810 B1 | 6/2011 |
| KR | 10-2013-0068172 A | 6/2013 |
| KR | 10-2013-0125522 A | 11/2013 |

* cited by examiner

VIDEO DISPLAY METHOD AND USER TERMINAL FOR GENERATING SUBTITLES BASED ON AMBIENT NOISE

CROSS-REFERENCE TO RELATED APPLICATION

This application claims the benefit under 35 USC 119(a) of Korean Patent Application No. 10-2014-0095706, filed on Jul. 28, 2014, in the Korean Intellectual Property Office, the entire disclosure of which is incorporated herein by reference for all purposes.

BACKGROUND

1. Field

The following description relates to a video display method and a user terminal for generating subtitles based on ambient noise.

2. Description of Related Art

With a proliferation of devices that may play videos, for example, smartphones, an increasing number of users watch videos in various locations and environments. For example, a user may view a video in a place around which a significant amount of noise occurs or only an infinitesimal amount of noise occurs.

However, in an environment in which ambient noise is so large that a voice signal of the video may not be heard, increasing a volume of the voice signal may not be effective, and placing a great amount of strain on ears poses a greater risk of the user developing a hearing-impairment. Conversely, in an environment in which ambient noise is so small that the voice signal of the video may be perceived, people around the user may feel uncomfortable by sound emanating from the video.

Accordingly, there is a desire for technology that may display a video adaptively to a surrounding environment.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a video display method of a user terminal, the method including determining whether ambient noise measured when a video is played is in an allowable range, and generating subtitles based on a voice signal included in the video in response to the ambient noise being determined to be out of the allowable range. The method further includes displaying the generated subtitles with the video.

The generating of the subtitles may include extracting the voice signal from the video, and generating the subtitles based on the extracted voice signal, using voice recognition.

The generating of the subtitles may include generating the subtitles based on whether earphones are connected to the user terminal.

The method may further include setting the allowable range based on either one or both of a characteristic of a user of the user terminal and a location of the user terminal.

The method may further include setting a magnitude of the allowable range based on whether earphones are connected to the user terminal.

The method may further include setting a lower limit value of the allowable range based on a location of the user terminal.

The method may further include setting an upper limit value of the allowable range based on a characteristic of a user of the user terminal.

The method may further include measuring the ambient noise based on whether earphones are connected to the user terminal.

A non-transitory computer-readable storage medium may include a program including instructions to cause a computer to perform the method.

In another general aspect, there is provided a user terminal, including a processor configured to determine whether ambient noise measured when a video is played is in an allowable range, and generate subtitles based on a voice signal included in the video in response to the ambient noise being determined to be out of the allowable range. The user terminal further includes a display configured to display the generated subtitles with the video.

The processor may be configured to extract the voice signal from the video, and generate the subtitles based on the extracted voice signal, using voice recognition.

The processor may be configured to generate the subtitles based on whether earphones are connected to the user terminal.

The processor may be further configured to set the allowable range based on either one or both of a characteristic of a user of the user terminal and a location of the user terminal.

The processor may be further configured to set a magnitude of the allowable range based on whether earphones are connected to the user terminal.

The processor may be further configured to set a lower limit value of the allowable range based on a location of the user terminal.

The processor may be further configured to set an upper limit value of the allowable range based on a characteristic of a user of the user terminal.

The processor may be further configured to measure the ambient noise based on whether earphones are connected to the user terminal.

In still another general aspect, there is provided a user terminal, including a processor configured to determine whether ambient noise measured when a video is played is in an allowable range, and a display configured to display subtitles of the video with the video in response to the ambient noise being determined to be out of the allowable range.

The processor may be further configured to measure the ambient noise based on signals received through a microphone, in response to earphones being connected to the user terminal, and measure the ambient noise by excluding a voice signal of the video from the signals in response to the earphones being not connected to the user terminal.

The processor may be further configured to increase the allowable range in response to the earphones being connected to the user terminal.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
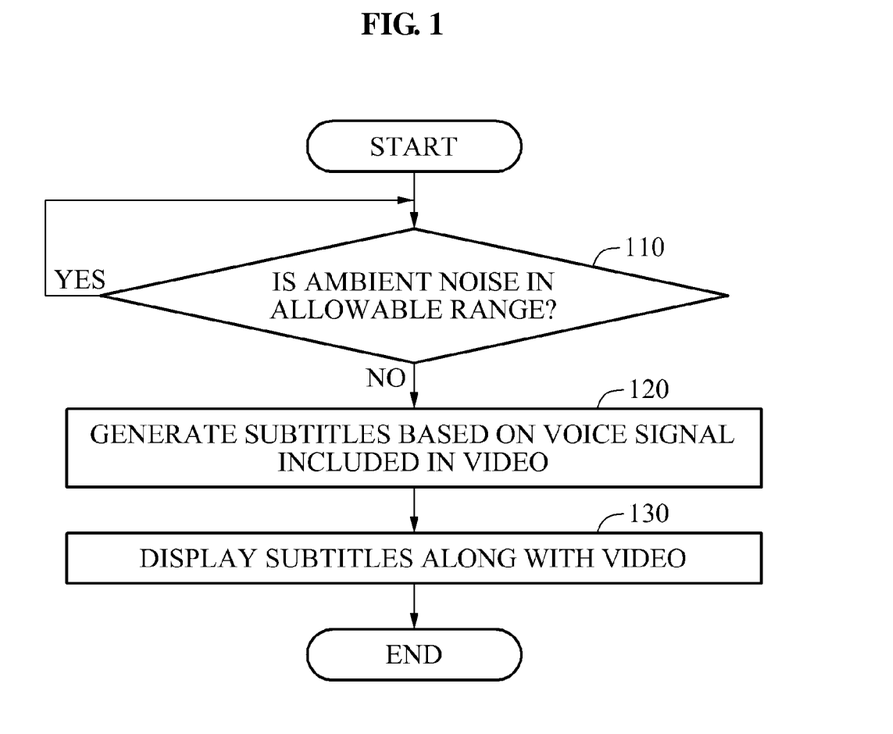
FIG. 1 is a diagram illustrating an example of a video display method.

FIG. 1 is a diagram illustrating an example of a video display method. The video display method to be described hereinafter may be performed by a processor included in a user terminal.

The user terminal may be a device that may display a video and include, for example, a mobile station, a smartphone, a personal digital assistant (PDA), a tablet personal computer (PC), a laptop, a portable terminal, a smart television (TV), and/or a digital video disc (DVD) player.

The user terminal may play a video. The user terminal may play the video by reading a video file from an embedded memory. Alternatively, the user terminal may play a video by receiving a video file through an embedded communication module. The user terminal may perform the following operations.

Referring to FIG. 1, in operation 110, the user terminal measures ambient noise generated when a video is played, and determines whether the measured ambient noise is in an allowable range. For example, the user terminal may activate a microphone of the user terminal to play the video, and measure ambient noise using the activated microphone. The user terminal may then determine whether the measured ambient noise is in a predetermined allowable range.

The ambient noise may be measured differently based on whether earphones are connected to the user terminal. The earphones may be a small device that may intensively output a voice signal to the user. In an example, when a user of the user terminal connects the earphones to the user terminal and listens to a voice signal of a video through the connected earphones, the voice signal of the video may not be detected by the microphone of the user terminal. Thus, the voice signal of the video may not affect ambient noise, and the user terminal may measure the ambient noise based on signals received through the microphone.

In another example, when the earphones are not connected to the user terminal, the user may view the video without the earphones. The voice signal of the video may then be output through a speaker of the user terminal. Thus, the voice signal of the video may be detected by the microphone, and affect the ambient noise.

In this example, user terminal may measure the ambient noise based on remaining input signals received through the microphone from which the voice signal of the video is excluded. The user terminal may obtain the voice signal of the video through a memory or a communication module embedded in the user terminal.

The user terminal may determine whether the ambient noise is in the allowable range every predetermined cycle. Alternatively, the user terminal may determine whether the ambient noise is in the allowable range every time the user terminal moves to another location.

When the measured ambient noise is determined to be in the allowable range, the user terminal returns to operation 110. That is, the user terminal measures ambient noise, and determines whether the measured ambient noise is in the allowable range, until the ambient noise is out of the allowable range or the video stops being played. When the measured ambient noise is determined to be out of the allowable range, the user terminal continues in operation 120.

In operation 120, the user terminal generates subtitles based on the voice signal included in the video. In detail, the allowable range may refer to a range within which the user may view a video without being affected by ambient noise. The allowable range may be preset by the user or a service provider. The allowable range may be defined by an upper limit value and a lower limit value.

The upper limit value of the allowable range may be a threshold value at which the user may have difficulty in listening to the voice signal of the video due to the ambient noise. Thus, the upper limit value of the allowable range may be differently set based on a hearing sensitivity of each user. The upper limit value of the allowable range may be set based on a characteristic of the user of the user terminal. The upper limit value of the allowable range may be preset by the user, and modified by the user after being set.

In another example, the upper limit value of the allowable range may be set based on a volume control of the voice signal by the user. Every time the user controls a volume of the voice signal, the user terminal may measure ambient noise at a point in time when the volume is controlled, match the controlled volume of the voice signal to the ambient noise, and store a result of the matching. The user terminal may statistically process the stored volume of the voice signal and the ambient noise measured based on the volume control, and set the upper limit value individualized for the user based on the processed volume of the voice signal and the ambient noise. After the individual upper limit value is set, the user terminal may update the individualized upper limit value of the allowable range every time the user controls the volume of the voice signal.

The lower limit value of the allowable range may be a threshold value at which ambient noise is so low that the voice signal of the video may be transmitted to another user present around the user terminal. The lower limit value of the allowable range may be set based on a place at which the user terminal is located.

An example of a method of setting the lower limit value of the allowable range will be described hereinafter by comparing a situation in which the user terminal is located at a library to a situation in which the user terminal is located at home. For example, when the user terminal is located at the library, which is a public place where numerous people are densely populated in a same place, a voice signal may be relatively easily transmitted to another user present around the user of the user terminal due to a characteristic of the library despite a magnitude of the voice signal being small. Thus, when a location of the user terminal has such a characteristic as the library, the allowable range may need to be set more strictly.

However, when the user terminal is located at home, which is a private place where other people are not populated dissimilar to the library, a voice signal may not cause an issue due to a characteristic of the home although the voice signal is spread around due to a small amount of ambient noise. Thus, when the location of the user terminal has such a characteristic as the home, the allowable range may not need to be set strictly. Accordingly, the lower limit value may be set to be lower when the user terminal is located in the private place such as the home in comparison to when the user terminal is located in the public place such as the library.

When measured ambient noise is lower than the lower limit value of the allowable range, the user terminal may generate the subtitles, and simultaneously reduce the volume of the voice signal by a preset level. Alternatively, the user terminal may generate the subtitles, and simultaneously reduce the volume of the voice signal to be a preset level.

The user terminal may verify the location of the user terminal using a position receiver. The position receiver may be a module that receives a current location, and includes, for example, a global positioning system (GPS) receiver. Alternatively, the user terminal may verify the location of the user terminal based on a location of a base station or an access point to be accessed through a communication module. The user terminal may map the verified location onto a map, and verify the location of the user terminal and a characteristic of the location.

A magnitude of the allowable range may be set based on whether the earphones are connected to the user terminal. For example, when the user views a video using the earphones, the user may be less sensitive to ambient noise. When the earphones are connected to the user terminal, an influence of the ambient noise on the user may be reduced. Thus, the upper limit value of the allowable range set when the earphones are connected to the user terminal may be greater than the upper limit value set when the earphones are not connected to the user terminal. A variation in the upper limit value set based on whether the earphones are connected to the user terminal may be preset by the user or the service provider.

In another example, when the user views the video using the earphones, the voice signal of the video may converge on the user rather than being spread to surrounding spaces. Thus, the voice signal of the video may be less likely to be heard by another user present around the user terminal. Accordingly, the lower limit value of the allowable range set when the earphones are connected to the user terminal may be lower than the lower limit value set when the earphones are not connected to the user terminal.

As described in the foregoing, when the earphones are connected to the user terminal, the upper limit value of the allowable range may be set higher and the lower limit value of the allowable range may be set lower than when the earphones are not connected to the user terminal. Thus, the magnitude of the allowable range set when the earphones are connected to the user terminal may be greater than that of the allowable range set when the earphones are not connected to the user terminal.

The user terminal generates the subtitles based on the voice signal included in the video. The user terminal may differently generate the subtitles based on whether the earphones are connected to the user terminal. In an example, when the earphones are connected to the user terminal, the user terminal may extract the voice signal from the video, and generate the subtitles from the extracted voice signal using voice recognition.

In another example, when the earphones are not connected to the user terminal, the user terminal may receive the voice signal output through the microphone when the video is played. The user terminal may then generate the subtitles from the voice signal using the voice recognition. Alternatively, when the earphones are not connected to the user terminal, the user terminal may extract the voice signal from the video stored in the memory or the video received through the communication module, and generate the subtitles from the voice signal using the voice recognition.

In operation 130, the user terminal displays the generated subtitles along with the video. The user terminal displays the subtitles to be matched to the voice signal of the video.

Figure 2:
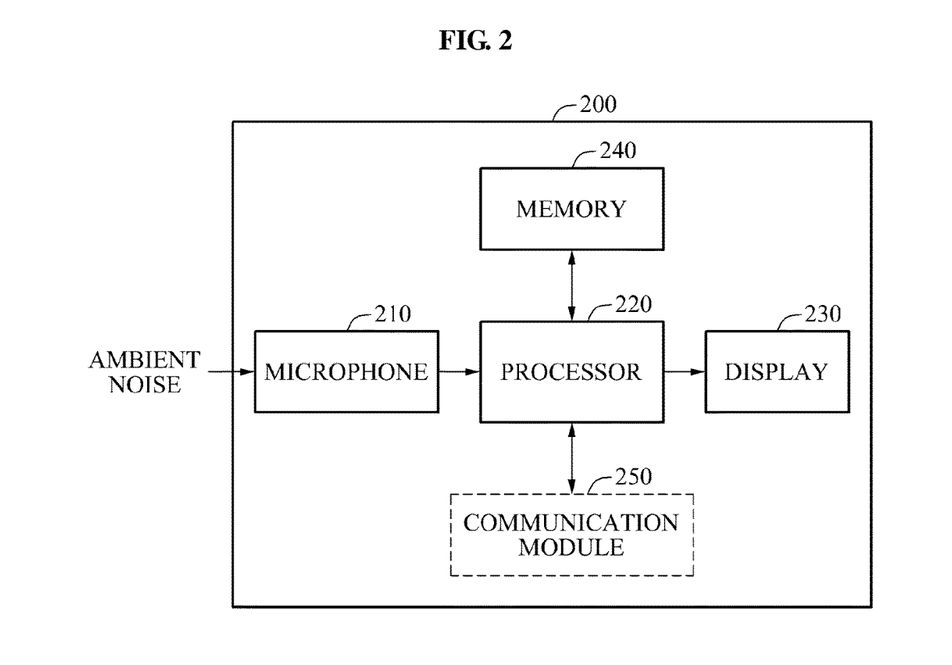
FIG. 2 is a diagram illustrating an example of a user terminal.

FIG. 2 is a diagram illustrating an example of a user terminal 200. Referring to FIG. 2, the user terminal 200 includes a microphone 210, a processor 220, a display 230, and a memory 240. The user terminal 200 may selectively include a communication module 250.

The microphone 210 measures ambient noise around the user terminal 200. When earphones are not connected to the user terminal 200, the microphone 210 receives a voice signal output through a speaker of the user terminal 200. The microphone 210 may be activated when the user terminal 200 plays the video.

The processor 220 is connected to at least one of the microphone 210, the display 230, the memory 240, and the communication module 250, and controls an overall operation of the user terminal 200. The processor 220 determines whether the ambient noise measured through the microphone 210 when the video is played is in an allowable range. When the ambient noise is determined to be not in the allowable range, the processor 220 generates subtitles based on the voice signal included in the video, and displays the generated subtitles along with the video on the display 230.

The processor 220 may differently measure the ambient noise through the microphone 210 based on whether the earphones are connected to the user terminal 200. When the earphones are connected to the user terminal 200, the processor 220 may measure the ambient noise based on signals input through the microphone 210. When the earphones are not connected to the user terminal 200, the processor 220 may measure the ambient noise based on remaining input signals received through the microphone 210 from which the voice signal of the video is excluded.

When the ambient noise is determined to be in the allowable range, the processor 220 continuously or repetitively measures ambient noise, and determines whether the measured ambient noise is in the allowable range, until the ambient noise is out of the allowable range.

The processor 220 may set the allowable range based on at least one of a characteristic of a user of the user terminal 200 and a location of the user terminal 200. The processor 220 may set the allowable range using an upper limit value and a lower limit value.

The processor 220 may set a magnitude of the allowable range based on whether the earphones are connected to the user terminal 200. The processor 200 may set the magnitude of the allowable range to be greater when the earphones are connected to the user terminal 200, in comparison to when the earphones are not connected to the user terminal 200.

The processor 200 may set the upper limit value of the allowable range based on the characteristic of the user of the user terminal 200. For example, the processor 220 may set the upper limit value of the allowable range to be a value input from the user.

In another example, the processor 220 may set the upper limit value of the allowable range based on a volume control of the voice signal that is performed by the user. Every time the user controls a volume of the voice signal, the processor 220 may measure ambient noise at a point in time when the volume is controlled, match the controlled volume of the voice signal to the ambient noise, and store a result of the matching in the memory 240. The processor 220 may apply a statistical method to the stored volume control and the ambient noise measured based on the volume control, and set the upper limit value individualized for the user based on a result of the application of the statistical method. After the individualized upper limit value is set, the processor 220 may update the individualized upper limit value of the allowable range every time the user controls the volume of the voice signal.

The processor 220 may set the lower limit value of the allowable range based on the location of the user terminal 200. The processor 220 may set the lower limit value to be higher when the location of the user terminal 200 is a public place, in comparison to when the location of the user terminal 200 is a private place.

The processor 220 may map the location of the user terminal 200 verified using a position receiver or the communication module 250 onto a map, and verify the location of the user terminal 200 and a characteristic of the location.

The processor 220 may extract the voice signal from the video, and generate the subtitles from the extracted voice signal using voice recognition. The processor 220 may differently generate the subtitles from the voice signal included in the video based on whether the earphones are connected to the user terminal 200.

For example, when the earphones are connected to the user terminal 200, the processor 220 may extract the voice signal from the video, and generate the subtitles from the voice signal using the voice recognition. However, when the earphones are not connected to the user terminal 200, the user terminal 200 may receive the voice signal output through the microphone 210 when the video is played. The user terminal 200 may then generate the subtitles from the voice signal using the voice recognition. Alternatively, when the earphones are not connected to the user terminal 200, the user terminal 200 may extract the voice signal from the video stored in the memory 240 or the video received through the communication module 250, and automatically generate the subtitles from the voice signal using the voice recognition.

The display 230 displays the video. The display 230 displays the generated subtitles in real time to match the subtitles to the voice signal of the video. The display 230 displays the subtitles along with the video.

The memory 240 stores the video being displayed on the display 230. When the user controls the volume of the voice signal, the memory 240 may match the ambient noise measured through the microphone 210 to the controlled volume of the voice signal, and store a result of the matching. The memory 240 provides stored data to the processor 220 by a request from the processor 220.

The communication module 250 communicates with a base station or an access point. The communication module 250 accesses a network provided by the base station or the access point, and receives a video from an external source of the user terminal 200. The communication module 250 provides the processor 220 with the video through streaming.

Figure 3:
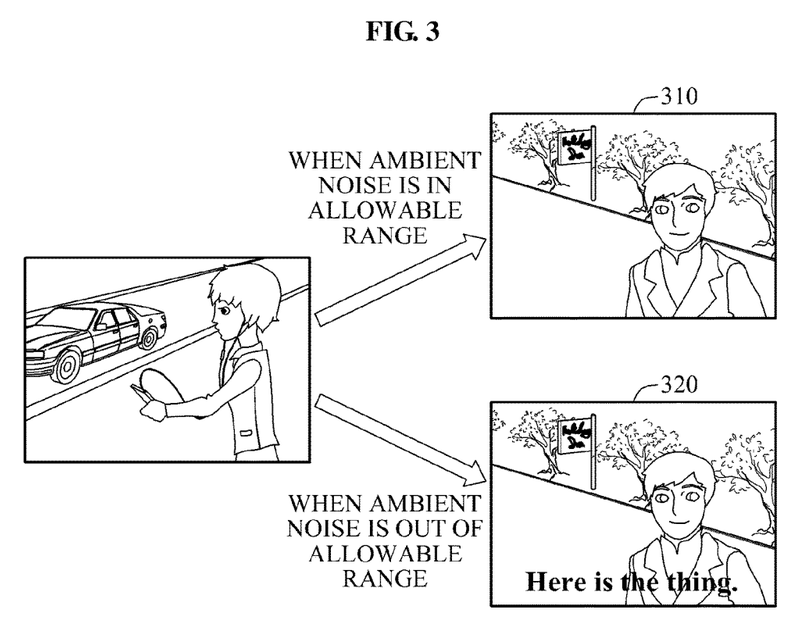
FIG. 3 is a diagram illustrating an example of displaying subtitles along with a video.

FIG. 3 is a diagram illustrating an example of displaying subtitles along with a video. In the example of FIG. 3, a user views the video using a user terminal. The user terminal measures ambient noise using a microphone of the user terminal.

Referring to FIG. 3, in operation 310, when the measured ambient noise is in a predetermined allowable range, the user terminal displays the video without generating subtitles.

Conversely, in operation 320, when the measured ambient noise is out of the predetermined allowable range, the user terminal generates the subtitles (e.g., "Here is the thing.") in real time from a voice signal of the video, using voice recognition. The user terminal then displays the generated subtitles along with the video.

After the user terminal displays, along with the video, the subtitles generated from the voice signal when the ambient noise is out of the allowable range, the user terminal may continuously or repetitively measure ambient noise, and determine whether the measured ambient noise is in the allowable range. When the measured ambient noise is determined to be in the allowable range, the user terminal may stop generating the subtitles from the voice signal of the video. Thus, the user terminal may exclusively display the video without generating the subtitles.

When ambient noise is out of an allowable range, the examples of the user terminal may provide, to a user, subtitles generated from a voice signal of a video using voice recognition, and thus, the user may understand contents of the video irrespective of the ambient noise. When the user has difficulty in listening to a voice signal of a video due to a significant amount of ambient noise, the user terminal may provide subtitles generated from the voice signal of the video using voice recognition, and thus, the user may avoid a risk of developing a hearing-impairment that may be caused by increasing a volume of the voice signal to a higher signal more than necessary.

When a voice signal of a video is likely to be spread around due to an excessively small amount of ambient noise, the examples of the user terminal may provide subtitles generated from the voice signal while decreasing a volume of the voice signal, and thus, a user may avoid a potential inconvenience while viewing the video, which may otherwise be caused due to the decreased volume of the voice signal. A service individualized for the user of the user terminal may be provided by setting an allowable range of the ambient noise based on at least one of a characteristic of the user and a location of the user terminal. The user terminal may perform an operation based on whether earphones are connected to the user terminal, and thus, a video display method described herein may be performed in the user terminal irrespective of whether the earphones are connected to the user terminal.

The various modules, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

As a non-exhaustive illustration only, a terminal or device described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blue-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A video display method of a user terminal for displaying a voice signal of a video, the method comprising:
   determining, by a processor, whether earphones are connected to the user terminal;
   in response to the determining ascertaining that the earphones are connected to the user terminal, setting, automatically by the processor, a first allowable range of an amount of ambient noise;
   in response to the determining ascertaining that the earphones are not connected to the user terminal, setting, automatically by the processor, a second allowable range of an amount of ambient noise that is less than the first allowable range;
   receiving, through a microphone of the user terminal, an audio signal when the video is played;
   in response to the determining ascertaining that the earphones are connected to the user terminal, measuring, by the processor, the amount of ambient noise based on the received audio signal, and determining, by the processor, whether the measured amount of ambient noise is in the first allowable range;
   in response to the determining ascertaining that the earphones are not connected to the user terminal, measuring, by the processor, the amount of ambient noise based on an audio signal obtained by excluding an audio signal comprised in the video from the received audio signal, and determining, by the processor, whether the measured amount of ambient noise is in the second allowable range;
   generating, by the processor, subtitles based on a voice signal comprised in the video, in response to the ambient noise being determined to be out of the first allowable range or the second allowable range; and
   displaying, on a display of the user terminal, the generated subtitles with the video.

2. The method of claim 1, wherein the generating of the subtitles comprises:
   extracting the voice signal from the video; and
   generating the subtitles based on the extracted voice signal, using voice recognition.

3. The method of claim 1, wherein the generating of the subtitles comprises:
   generating the subtitles based on whether earphones are connected to the user terminal.

4. The method of claim 1, further comprising:
   setting either the first or second allowable range based on either one or both of a characteristic of a user of the user terminal and a location of the user terminal.

5. The method of claim 1, further comprising:
   setting a lower limit value of either the first or second allowable range based on a location of the user terminal.

6. The method of claim 1, further comprising:
   setting an upper limit value of either the first or second allowable range based on a characteristic of a user of the user terminal.

7. The method of claim 1, further comprising:
   measuring the ambient noise based on whether the earphones are connected to the user terminal.

8. A non-transitory computer-readable medium storing instructions that, when executed by a processor, cause the processor to perform the method of claim 1.

9. A user terminal for playing a video including a voice signal, comprising:
   a processor configured to:
      determine whether earphones are connected to the user terminal;
      in response to a determination ascertaining that the earphones are connected to the user terminal, set a first allowable range of ambient noise;
      in response to a determination ascertaining that the earphones are not connected to the user terminal, set a second allowable range of an amount of ambient noise that is less than the first allowable range;
      receiving, through a microphone of the user terminal, an audio signal when the video is played;
      in response to a determination ascertaining that the earphones are connected to the user terminal, measure the amount of ambient noise based on the received audio signal and determine whether the measured amount of ambient noise is in the first allowable range;
      in response to a determination ascertaining that the earphones are not connected to the user terminal, measure the amount of ambient noise based on an audio signal obtained by excluding an audio signal comprised in the video from the received audio signal and determine whether the measured amount of ambient noise is in the second allowable range; and
      generate subtitles based on the voice signal included in the video, in response to the ambient noise being determined to be out of the first allowable range or the second allowable range; and
   a display configured to display the generated subtitles with the video.

10. The user terminal of claim 9, wherein the processor is configured to:
    extract the voice signal from the video; and
    generate the subtitles based on the extracted voice signal, using voice recognition.

11. The user terminal of claim 9, wherein the processor is configured to generate the subtitles based on whether the earphones are connected to the user terminal.

12. The user terminal of claim 9, wherein the processor is configured to set either the first or second allowable range based on either one or both of a characteristic of a user of the user terminal and a location of the user terminal.

13. The user terminal of claim 9, wherein the processor is further configured to set a lower limit value of either the first or second allowable range based on a location of the user terminal.

14. The user terminal of claim 9, wherein the processor is further configured to set an upper limit value of either the first or second allowable range based on a characteristic of a user of the user terminal.

15. The user terminal of claim 9, wherein the processor is further configured to measure the ambient noise based on whether the earphones are connected to the user terminal.

16. A user terminal for playing a video including an audio signal, comprising:
   a processor configured to:
      determine whether earphones are connected to the user terminal,
      set, based on user terminal volume control statistics, an allowable range of ambient noise,
      receive, through a microphone of the user terminal, an audio signal when the video is played, and
      determine whether an amount of ambient noise measured when the video is played is in the allowable range; and
   a display configured to display subtitles of the video with the video, in response to the ambient noise being determined to be out of the allowable range,
   wherein the user terminal volume control statistics are determined by statistically processing a plurality of past volume controls of the audio signal previously performed by a user and a plurality of amounts of ambient noise measured for each of the plurality of past volume controls,
   wherein the processor is configured to set the allowable range of ambient noise by recalling a previously measured amount of ambient noise from the plurality of amounts of ambient noise and its associated past volume control from the plurality of past volume controls, and
   wherein the processor is configured to measure the amount of ambient noise based on the received audio signal in response to a determination ascertaining that the earphones are connected to the user terminal, and measure the amount of ambient noise based on an audio signal obtained by excluding an audio signal comprised in the video from the received audio signal in response to a determination ascertaining that the earphones are not connected to the user terminal.

17. The user terminal of claim 16, wherein the processor is further configured to increase the allowable range in response to the earphones being connected to the user terminal.

18. The method of claim 1, further comprising:
   decreasing, by the processor, a volume level of an audio signal output from a speaker of the user terminal, in response to the determining ascertaining that the earphones are not connected to the user terminal and in response to the ambient noise being determined to be less than the lower limit of the second allowable range.

* * * * *